Z. P. CANDEE.
POWER TRANSMISSION MECHANISM AND CONTROLLING MEANS THEREFOR.
APPLICATION FILED SEPT. 5, 1918.
1,322,534.
Patented Nov. 25, 1919.
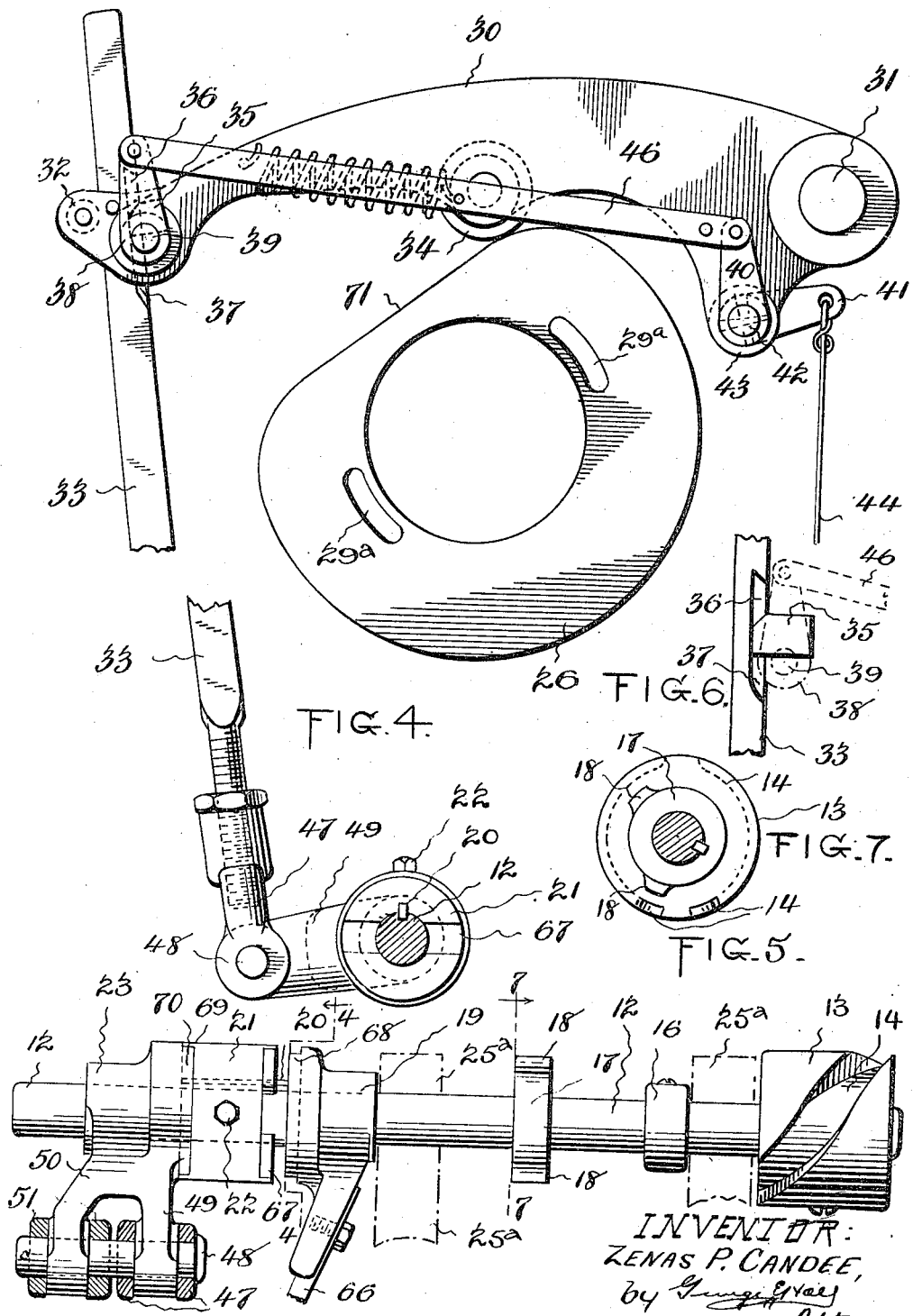

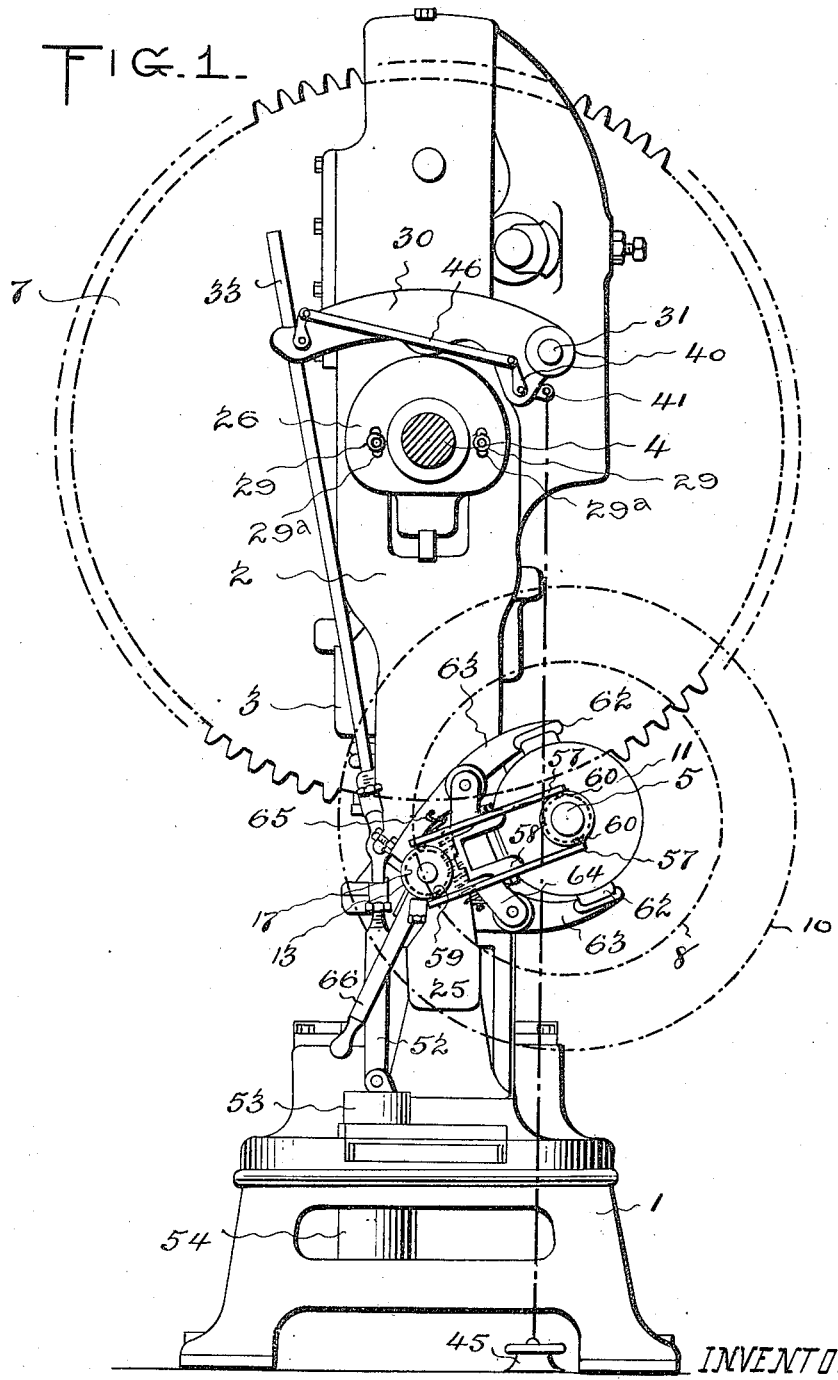

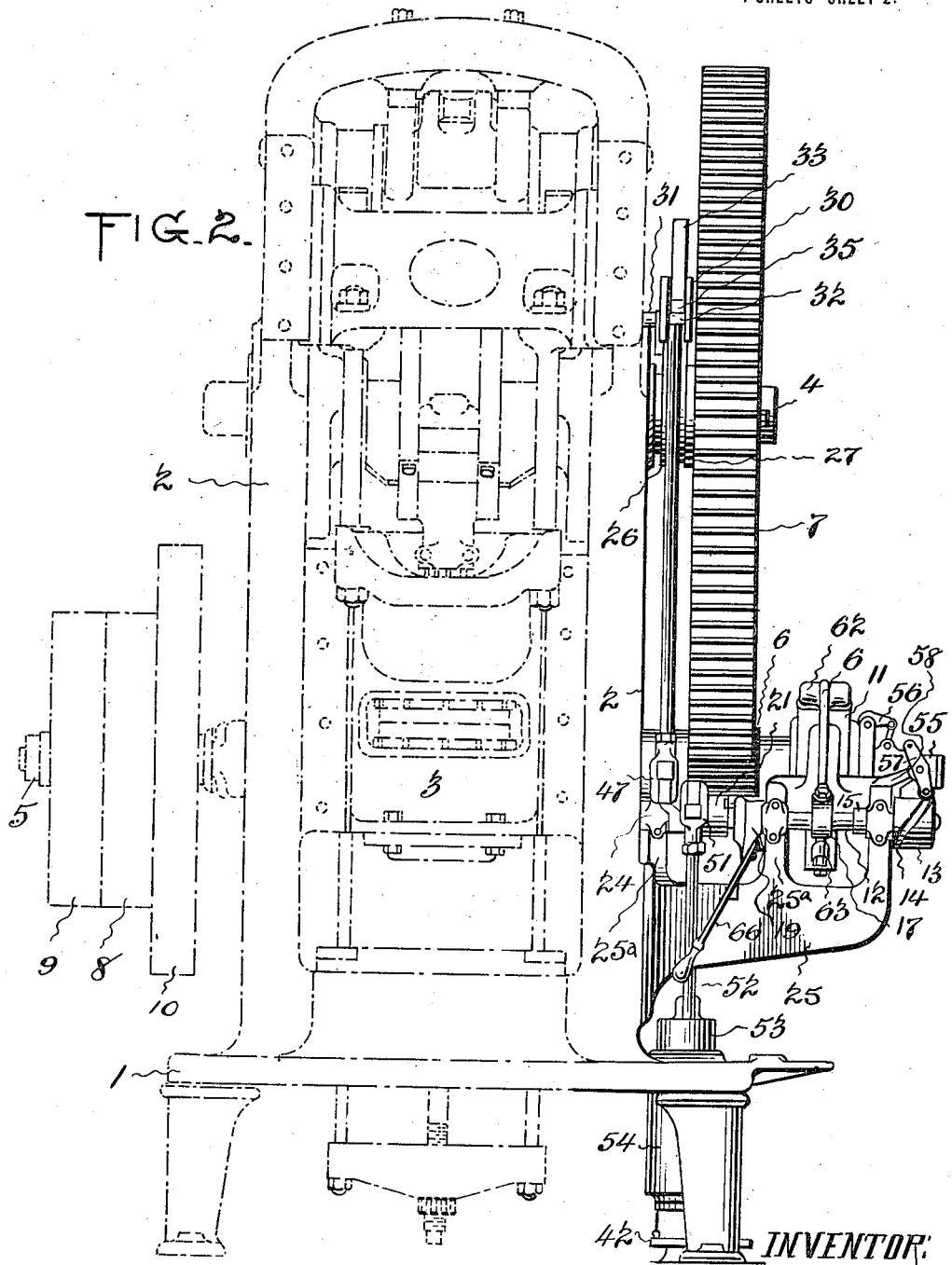

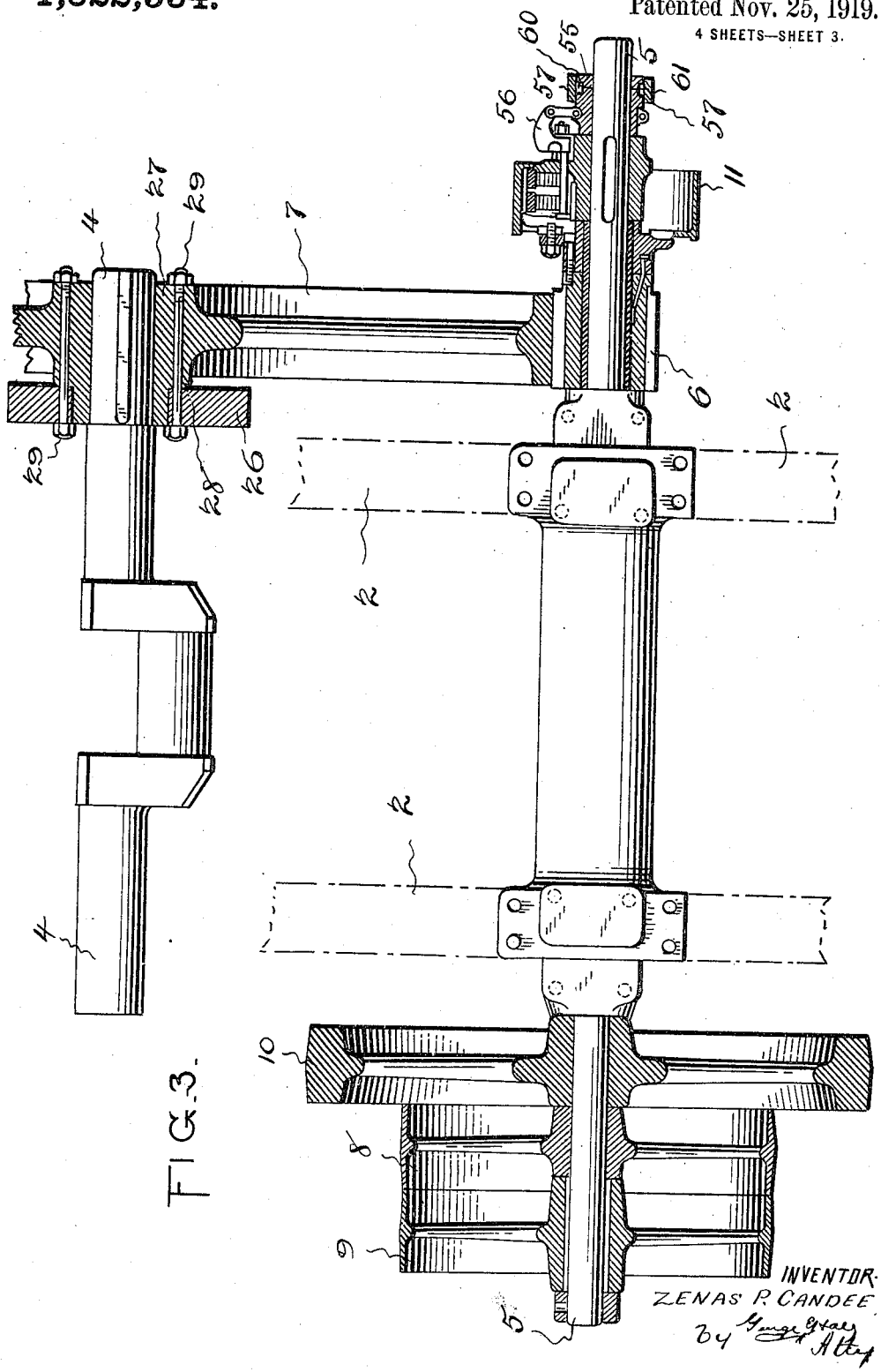

UNITED STATES PATENT OFFICE.

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

POWER-TRANSMISSION MECHANISM AND CONTROLLING MEANS THEREFOR.

1,322,534.      Specification of Letters Patent.      Patented Nov. 25, 1919.

Application filed September 5, 1918. Serial No. 252,758.

*To all whom it may concern:*

Be it known that I, ZENAS P. CANDEE, a citizen of the United States, residing at Waterbury, in the county of New Haven and State of Connecticut, have invented certain new and useful Improvements in Power-Transmission Mechanism and Controlling Means Therefor, of which the following is a specification, reference being had therein to the accompanying drawings.

The present invention relates to machines, such as power presses, for example, and has for its object, among other things, to provide a simple and efficient mechanism for controlling the operation of the working parts of a machine, whereby the same may be intermittently operated, under control of the operator, without shuttting off the continuous power by means of which said working parts are operated.

The improvements hereinafter set forth, in the broadest aspect thereof, consist essentially in the provision of controlling means for establishing an operative relationship between the power driving means and power transmitting means of a machine and said controlling means being associated with a device or devices, to which motion is given by stored up energy, taken from one operation of the machine and utilized to operate said controlling means whereby a subsequent operation of the machine is effected or permitted.

An embodiment of the invention is illustrated in the accompanying drawings, and hereinafter described as applied to a particular type of power press, forming the subject matter of another invention, but it will be understood, the improvements may also be applied, with advantage, to various types of power presses or other machines to which they are applicable.

Referring to the drawings, in which like numerals of reference designate like parts in the several figures;—

Figure 1 is a side elevation of a press, showing the working parts thereof in a position of rest;

Fig. 2 is a front elevation of a press, showing in full lines, the improved control mechanism and parts of the press directly associated with said mechanism;

Fig. 3 is a detail sectional view showing one form and arrangement of power devices, power transmitting mechanism, and a controlling clutch device as applied to a power press, for instance;

Fig. 4 is a detail view showing parts of the improved control mechanism, one part being mounted on a shaft shown in section, taken upon line 4—4 of Fig. 5;

Fig. 5 is a detail view showing other parts of the said control mechanism;

Fig. 6 is a detail view showing a part of the latch device; and

Fig. 7 is a detail sectional view, taken upon line 7—7 of Fig. 5.

Referring to the drawings, the numeral 1 designates the bed of the machine supporting standards 2, constituting a frame in which the operating element 3 is caused to reciprocate by action of the crank shaft 4. Rotative motion is imparted to said crank shaft by the main shaft 5 through a suitable reducing driving gear consisting of pinion 6 fixedly mounted on said main shaft and meshing with gear wheel 7 fixedly mounted on the crank shaft 4. The main shaft 5 has mounted thereon the usual driving and controlling devices consisting of the fixed pulley 8, loose pulley 9, balance wheel 10 and friction clutch 11.

The improved controlling mechanism comprises a rock shaft 12, on which is mounted a plurality of devices performing functions hereinafter set forth, said devices consisting of a clutch operating block 13, fixed on said shaft, and having a cam groove 14 at each side thereof; a collar 15 held in place by set screw 16 and employed to properly position the shaft 12; a brake actuating cam device 17 fixed on the shaft and having horns or projections 18; a hand operated lever head 19 movably mounted on the shaft 12 and having a limited sliding movement on the feather 20; an adjustable block 21 sliding on feather 20 and retained in a fixed position by set screw 22; and an arm 23, free relatively to the shaft, when not engaged by block 21 in its fixed position on the shaft 12. This shaft 12 turns in bearings 24 carried on lugs 25ᵃ provided on bracket 25, which is secured to one of the standards 2.

The rock shaft 12 is operated by means of a cam 26 from the hub 27 of the gear wheel 7, to which the cam is bolted on a shouldered portion 28 of the said hub 27, the bolts 29 passing through elongated slots 29ᵃ, whereby the cam 26 may be set in adjusted positions relatively to the crank shaft 4. An operating lever 30 is pivotally mounted at one end on the stud or shaft 31 and the free end of this lever is forked and carries an anti-friction roller 32 which engages a bar 33 passing through the forked end of said lever. A cam roller 34 is carried on the lower edge of the lever 30, intermediate of its ends, and said cam roller engages the cam 26 in a manner so that when the cam roller is engaged at the highest point of the cam, the lever 30 will be lifted. A latch and tripping device is employed to make and break operative engagement of the lever 30 with the bar 33, through the means of a catch block 35 engaging the edge of a hard metal piece 36 inserted in the notch 37 on the bar 33. The catch block 35 is moved into or out of an engaged position by crank 38 fixed on pin 39. The crank 38 is operated by cranks 40 and 41, constituting a bell crank lever, pivoted on shaft 42, carried by lug 43 on lever 30. Motion is given to the said bell crank lever, in the direction to release the catch 35, by means of a pull cord or rod 44, operated by a treadle 45, and such motion is transmitted to the crank 38 by connecting bar 46.

The lower end of the connecting bar 33 is threaded and carries an adjustable forked head 47 which is pivotally mounted on pin 48 in lug 49 on the arm 23. A companion lug 50, on the arm 23, has pivotally connected thereto, also on pin 48, the forked end 51 of a connecting bar 52, which is practically an extension of the bar 33. The lower end of the bar 52 is connected to a weighted dash-pot plunger 53 which slides within dash-pot cylinder 54, so that sudden fall of the plunger is checked.

The power transmission clutch 11 mounted on the main or power shaft 5 is of any ordinary suitable type, and the clutch elements thereof are engaged and disengaged by means of the usual sliding block 55 and yoke device 56. According to the present invention, the said sliding block 55 is operated by means of clutch levers 57 pivotally mounted on bracket 58, which is secured to bracket 25. The levers 57 are provided with lugs 59 and 60 at each end, which engage respectively the groove 61 in the sliding block 55 and the grooves 14 on the clutch cam block 13. By this engagement, when the rock shaft 12 is partly rotated in one direction, the ends of the lever 57, engaged by the clutch block 13, move outwardly and the other ends of said lever move inwardly, whereby the clutch is thrown into an engaged position. In a reverse rotation of the rock shaft, a reverse operation of the clutch lever is effected and then the clutch is disengaged and left to run freely.

A brake device is provided and acts simultaneously with the operation of the clutch, and which brake device comprises a pair of brake shoes 62 carried at the outer ends of the brake levers 63, and in their operative position engaging the periphery of the clutch 11. Brake levers 63 are pivotally connected at an intermediate point to projecting arms 64 of the bracket 58. The inner ends of the brake levers are drawn together by a spring 65, so that normally the brake shoes are held in the off or non-contact position. The brake cam 17, by means of the horns 18 thereon, engaging the ends of the brake levers 63, spreads the levers 63 apart against the spring 65, in a manner so as to apply the brakes when the clutch is disengaged, whereby instantaneous stopping of the motion of the working parts of the machine is obtained.

The handle 66 is provided in order that operation of the lock shaft 12, and indirectly thereby the clutch 11, may be effected manually if desired. When the operation of the rock shaft is to be entirely manual, it is necessary that the sliding block 21 should be loosened and moved on the feather 20 so that the clutch elements 67 and 68, provided respectively on the block 21 and the head or lever end 19, are engaged and the clutch elements 69 and 70 respectively provided on the said block 21 and arm 23, are separated. In the position, when the lever head 19 engages the block 21, the rock shaft 12 may be turned to operate the clutch independently of the controlling mechanism hereinbefore described.

The operation of the aforesaid controlling mechanism, when the sliding block 21 permanently engages the arm 23, is as follows:

Assuming that the power for operating the press is running and the gate or operating member 3 is in a state of rest, at the highest point of its travel, or any other relative position which may be determined by setting the cam 26 in different positions, the operating lever 30 is then raised to its highest position by the cam 26, the latch device 35—36 being engaged, the connecting bar 33 is raised with the lever 30, and the raising of the bar 33 has turned the arm 23 and block 21 as one body and with said latter members the rock shaft 12 is turned approximately 80° of a revolution, sufficient to operate the clutch and brake actuating mechanism and thus effect a discontinuation of the action of the press. The arm 23 also raises bar 52 and with the latter member the weighted dash-pot plunger 53 is lifted. The latch device holds the bar 33 in the raised position against the weight of the dash-pot plunger 53 and when the treadle 45 is depressed the trip device is operated to release the latch. The bar 33 and arm 23 are then caused to fall by releasing the weighted dash-pot plunger and the rock shaft is thereby turned in the reverse direction approximately 80° of a revolution to operate the means for freeing the brakes and clutch. The press then performs a complete operation and when the cam lever 30 is at its lowest point and the cam roller 34 engages the flat surface 71 on the cam 26, the said lever 30 again picks up the bar 33 if the latch device is engaged. The operation of the controlling mechanism is then repeated but if the operator constantly holds the treadle 45 in a depressed position the latch device will not engage the bar 33, consequently the press will run continuously while power is applied thereto regardless of said controlling mechanism.

Obvious modifications may be made without departing from the spirit of the invention as defined in the appended claims.

Having described my invention, what I claim as new and desire to secure by Letters Patent, is:—

1. In a machine of the class described operating and controlling mechanism comprising a clutch; a rock shaft; a cam connected with said shaft; a member for actuating said clutch and receiving motion from said cam; an oscillating member; a connecting rod transmitting motion from said member to said rock shaft; and means whereby energy from a preceding operation of said oscillating member is stored up to operate said rock shaft to engage said clutch.

2. In a machine of the class described operating and controlling mechanism comprising a clutch; a rock shaft; a cam connected with said shaft; a member for actuating said clutch and receiving motion from said cam; an oscillating member; a connecting rod transmitting motion from said member to said rock shaft; means whereby energy from a preceding operation of said oscillating member is stored up to operate said rock shaft to engage said clutch; and a device for breaking the connection between said oscillating member and said connecting rod so as to permit operation of said means.

3. In a machine of the class described, the combination with a power shaft; of controlling mechanism, comprising a clutch; a rock shaft; a cam connected with said shaft; a member for actuating said clutch and receiving motion from said cam; a cam on said power shaft; an operating lever actuated by said last mentioned cam; a member coöperatively connecting said lever to said rock shaft; means for making and breaking the connection between said lever and member to allow independent movement of said member; and a device associated with said member for independently operating said rock shaft to impart rotary movement thereto.

4. In a machine of the class described, the combination with a power shaft; of controlling mechanism, comprising a rock shaft; a cam on said rock shaft; a clutch; a member between said cam and clutch having operative connection with a cam on said power shaft; an operating lever actuated by said cam; a member coöperatively connecting said lever to said rock shaft; means for making and breaking the connection between said lever and member to allow independent movement of said member; a device associated with said member for independently operating said rock shaft to operate said clutch; and means for retarding the action of said device.

5. In a machine of the class described, the combination of a power shaft and a crank shaft driven thereby through the medium of a clutch; means for operating said clutch to obtain intermittent operation of said crank shaft; a rock shaft for imparting motion to the clutch operating means; and means actuated by said crank shaft for operating said rock shaft in one direction and to store up energy whereby said rock shaft is operated in a reverse direction, said means comprising a lever transmitting motion to said rock shaft through a pull member, a make and break connection between said lever and member, and a device associated with said member for operating said rock shaft when the connection between said lever and member is broken.

6. In a machine of the class described; a driving element; a driven element; a clutch interposed between said elements; a rock shaft actuating said clutch; and means operated by said driven element whereby said rock shaft is positively rotated thereby in one direction and in a reverse direction by energy stored up in said means, said means comprising a lever transmitting motion to said rock shaft through a pull member, a make and break connection between said lever and member, and a device associated with said member for operating said rock shaft when the connection between said lever and member is broken.

7. In a machine having a power shaft driving a crank shaft through a clutch; a rock shaft actuating said clutch; and means operated by said crank shaft whereby said rock shaft is rotated directly in one direction and indirectly in a reverse direction by stored up energy, said means comprising a lever transmitting motion to said rock shaft through a pull member, a make and break connection between said lever and member, and a device associated with said member for operating said rock shaft when the connection between said lever and member is broken.

8. In a press having power driving elements and power transmitting and controlling mechanism, the latter comprising a clutch, a crank shaft, and a rock shaft; clutch levers for actuating said clutch from said rock shaft; a cam on said crank shaft; a cam lever having a lifting movement imparted thereto by said cam; a pull member having a severable connection with said lever engaged during the upward movement of said lever to effect operation of said rock shaft in one direction of rotation and an energy storing device associated with said rock shaft and operated thereby to store up energy whereby said device when released rotates said rock shaft in a reverse direction.

9. In a press having power driven elements, power transmitting and controlling mechanism comprising a clutch, a brake for said clutch operating simultaneously therewith, a crank shaft, a rock shaft, separate levers for actuating said clutch and brake from said rock shaft; means comprising a cam, a cam lifted lever, and a pull member having a separable connection with said lever for imparting rotative motion during the upward movement of said lever to said rock shaft from said crank shaft in one direction of rotation and a device connected to said pull member in which energy imparted to said means is stored up and subsequently utilized to rotate said rock shaft in a reverse direction.

10. In a machine of the class described, power transmitting mechanism having a crank shaft, a rock shaft, a clutch, and means for actuating and controlling said clutch, said means comprising a lifting lever operated by said crank shaft; a pull rod severably connected to said lever and transmitting motion therefrom to said rock shaft; means for effecting a connection between said lever and said pull rod; and a tripping device carried by said lever whereby the connection between said lever and said pull rod is broken at predetermined times.

11. In a machine of the class described; power transmission mechanism and controlling means having a power shaft, a rock shaft, and a clutch; actuating and controlling means for said clutch operatively associated with said rock shaft, said means comprising a member operated by said power shaft, and a device effecting a connection between said member and said rock shaft controlled by a latch and tripping device mounted on said member and operatable at predetermined times.

12. In a machine of the class described; power transmission and controlling means comprising a power shaft, a rock shaft, and a clutch; actuating and controlling means for said clutch operatively associated with said rock shaft, said means comprising a main operating lever engaged by a cam on said power shaft; a connecting member secured between said main lever and an arm carried by said rock shaft, a cam block on said rock shaft, clutch levers transmitting motion from said cam block to said clutch; and a device carried by said main lever for making and breaking a connection effected by said connecting member between said main lever and said arm.

13. In a machine of the class described, power transmission and controlling mechanism having a crank shaft, a rock shaft, a clutch, and actuating and controlling means for said clutch operatively associated with said rock shaft, said means comprising an operating lever engaged by a cam on said power shaft, a connecting device for establishing an operative relation between said lever and said rock shaft, whereby rotation of the latter member is effected in one direction, means whereby such rotation of the rock shaft stores up energy for effecting a reverse rotation of said rock shaft, and a tripping device carried by said operating lever releasable at predetermined times for breaking said operative relation between the said lever and said rock shaft to permit said reversed operation of the rock shaft.

14. In a machine having power transmitting and controlling mechanism for effecting an intermittent operation of the working elements of the machine; a crank shaft; a clutch device; a rock shaft operating said clutch device and being rotated in one direction by said crank shaft to disengage said clutch; a member operated by a cam on said crank shaft effecting said operation; and a bar connecting said member with said rock shaft; a device associated with said bar and said rock shaft wherein when said bar is raised by said member energy is stored up to rotate said rock shaft in a reverse direction to engage said clutch; and means carried by said member and said bar for releasing said bar from its engaged position relatively to said member whereby said reverse operation of the shaft is effected by the self-action of said device.

15. In a machine having power transmitting and controlling mechanism for effecting either a continuous or an intermittent operation of the working elements of the machine; a crank shaft; a clutch device; a rock shaft operating means for disengaging said clutch device, when rotated in one direction by said crank shaft, through the medium of means, comprising a movable member operated by a cam mounted on said crank shaft and an element connecting said movable member with said rock shaft; a device associated with said rock shaft and capable of being operated to store up energy whereby said rock shaft is rotated in a reverse direction to engage said clutch; a tripping device for making and breaking the connection between said movable member and said element to obtain intermittent operation of the working elements of the machine; and manually operated means for disengaging and independently operating the rock shaft whereby a continuous operation of said elements is obtainable.

16. In a machine of the class described; a crank shaft; a rock shaft; a clutch actuated by means operated by said rock shaft; means for rotating said rock shaft and disengaging said clutch, said means comprising a lever, a cam on said crank shaft operating said lever, an element connecting said rock shaft to said lever, a latch and tripping device for making and breaking said connection between said lever and said element, an arm secured to the said rock shaft at one end and to the said element at the other end, a weighted dash-pot plunger connected to said arm; and means for releasing said tripping device to permit said weighted plunger, which is raised by operation of the rock shaft when operating to disengage the clutch, to fall and rotate said rock shaft in a reverse direction to engage said clutch.

17. In a machine of the class described, a crank shaft; a rock shaft; a clutch actuated by means operated by said rock shaft; a brake for said clutch operating simultaneously therewith; means for rotating said rock shaft and disengaging said clutch and said brake, said means comprising a lever, a cam on said rock shaft operating said lever, an element connecting said rock shaft to said lever, a latch and tripping device for making and breaking said connection between said lever and said element, an arm secured to said rock shaft at one end and to the said element at the other end, a weighted dash-pot plunger connected to said arm, and means for releasing said tripping device to permit said weighted plunger, which is raised by operation of the rock shaft when operating to disengage the clutch, to rotate said rock shaft in a reverse direction to engage said clutch.

18. In a machine of the class described; a crank shaft; a rock shaft; a clutch actuated by means operated by said rock shaft; means for rotating said rock shaft and disengaging said clutch. said means comprising a lever, a cam on said rock shaft engaging and operating said lever, an element connecting said rock shaft to said lever, a latch and tripping device for making and breaking said connection between said lever and said element, an arm secured to said rock shaft at one end and to the said element at the other end, a weighted dash-pot plunger connected to said arm, means for releasing said tripping device to permit said weighted plunger, which is raised by operation of the rock shaft when operating to disengage the clutch, to fall and rotate said rock shaft in a reverse direction to engage said clutch; and manually operated means for disassociating said rock shaft from the aforesaid power means employed for operating said rock shaft and whereby said rock shaft is operated independently of said power means.

19. In a control mechanism as described; an operating member; an operated member; a power transmission connecting member communicating motion from said operating member to said operated member; and means carried by and constantly moving with said operating member and in one direction with said connecting member for making and breaking the connection between said operating member and said connecting member.

20. In a control mechanism as described; an operating member; an operated member; a power transmission connecting member communicating motion from said operating member to said operated member; and independently actuatable means operated from a distant point and carried by and moving with said operating member for making and breaking an operative relation between said members.

In testimony whereof I have hereunto affixed my signature.

ZENAS P. CANDEE.